(12) United States Patent
Sakai (10) Patent No.: US 10,558,404 B2
(45) Date of Patent: Feb. 11, 2020

(54) PRINTING APPARATUS, CONTROL METHOD, AND STORAGE MEDIUM

(71) Applicant: CANON KABUSHIKI KAISHA, Tokyo (JP)

(72) Inventor: Shigeto Sakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/936,153

(22) Filed: Mar. 26, 2018

(65) Prior Publication Data
US 2018/0300092 A1 Oct. 18, 2018

(30) Foreign Application Priority Data
Apr. 17, 2017 (JP) .................................. 2017-081620

(51) Int. Cl.
*G06F 3/12* (2006.01)
*H04L 29/06* (2006.01)

(52) U.S. Cl.
CPC ............ *G06F 3/1209* (2013.01); *G06F 3/126* (2013.01); *G06F 3/1239* (2013.01); *G06F 3/1294* (2013.01); *H04L 69/18* (2013.01)

(58) Field of Classification Search
None
See application file for complete search history.

(56) References Cited

U.S. PATENT DOCUMENTS

| 2009/0307359 | A1* | 12/2009 | Akita | G06F 3/1213 |
| | | | | 709/228 |
| 2015/0031404 | A1* | 1/2015 | Yada | H04W 76/25 |
| | | | | 455/508 |
| 2015/0092601 | A1* | 4/2015 | Ando | H04W 76/10 |
| | | | | 370/254 |
| 2016/0006901 | A1* | 1/2016 | Torigoshi | H04N 1/32545 |
| | | | | 358/1.15 |

FOREIGN PATENT DOCUMENTS

JP 2014-49022 A 3/2014

* cited by examiner

*Primary Examiner* — Fan Zhang
(74) *Attorney, Agent, or Firm* — Canon U.S.A., Inc. IP Division

(57) ABSTRACT

A printing apparatus manages the number of communications for printing requests to prevent the number of communications using the predetermined protocol from reaching an upper limit, in a case where a print job is received by using a predetermined protocol.

20 Claims, 9 Drawing Sheets

PRINTING APPARATUS, CONTROL METHOD, AND STORAGE MEDIUM

BACKGROUND

Field of the Disclosure

The present disclosure relates to a printing apparatus, a control method, and a storage medium.

Description of the Related Art

An internet printing protocol (IPP) has been known as a protocol used for printing. Japanese Patent Application Laid-Open No. 2014-49022 discusses a technique of concurrently establishing a plurality of communications by using the IPP.

However, in Japanese Patent Application Laid-Open No. 2014-49022, an upper limit is not taken into consideration when a plurality of communications is established concurrently. Therefore, if the number of communications reaches the upper limit, communication cannot be newly established until at least one communication is completed, so that there is a risk that the information processing apparatus cannot acquire a state of the printing apparatus.

SUMMARY

According to an aspect of the present invention, a printing apparatus to which a first upper limit number of communications concurrently sustainable through a predetermined protocol and a second upper limit number smaller than the first upper limit number are set, the printing apparatus includes an establishment unit configured to establish communication according to the predetermined protocol with an information processing apparatus in a case where a number of communications using the predetermined protocol is smaller than the first upper limit number, and a control unit configured to notify the information processing apparatus of a state where a print job is not acceptable through the established communication in a case where an information acquiring request is received from the information processing apparatus through the established communication, and the number of communications exceeds the second upper limit number because of communication established by the establishment unit.

Further features of the present invention will become apparent from the following description of exemplary embodiments with reference to the attached drawings.

DESCRIPTION OF THE EMBODIMENTS

Hereinafter, a preferred exemplary embodiment of the present invention will be illustratively described with reference to the appended drawings. It is to be understood that variations or improvements which do not depart from the novel content of the present invention may be appropriately made on the basis of common knowledge of persons skilled in the art with respect to the below-described exemplary embodiments, and such variations should be taken as being included within the scope of the invention.

Hereinafter, a first exemplary embodiment will be described. An information processing apparatus and a communication apparatus included in a communication system of the present exemplary embodiment will be described. The information processing apparatus may be a personal computer or a notebook personal computer (PC). In the present exemplary embodiment, although a printer is taken as an example of the communication apparatus, the exemplary embodiment is not limited thereto, and an apparatus of any type is applicable as long as the apparatus can wirelessly communicate with the information processing apparatus. For example, the present invention is applicable to a printer such as an ink jet printer, a full-color laser beam printer, or a monochromatic printer. Further, the present invention is applicable not only to a printer but also to a copying machine, a facsimile apparatus, a mobile terminal, a smartphone, a notebook PC, a tablet terminal, a personal digital assistance (PDA), a digital camera, a music reproduction device, or a television. Furthermore, the present invention is applicable to a multifunction peripheral having a plurality of functions such as a copying function, a facsimile function, and a printing function.

Figure 1:
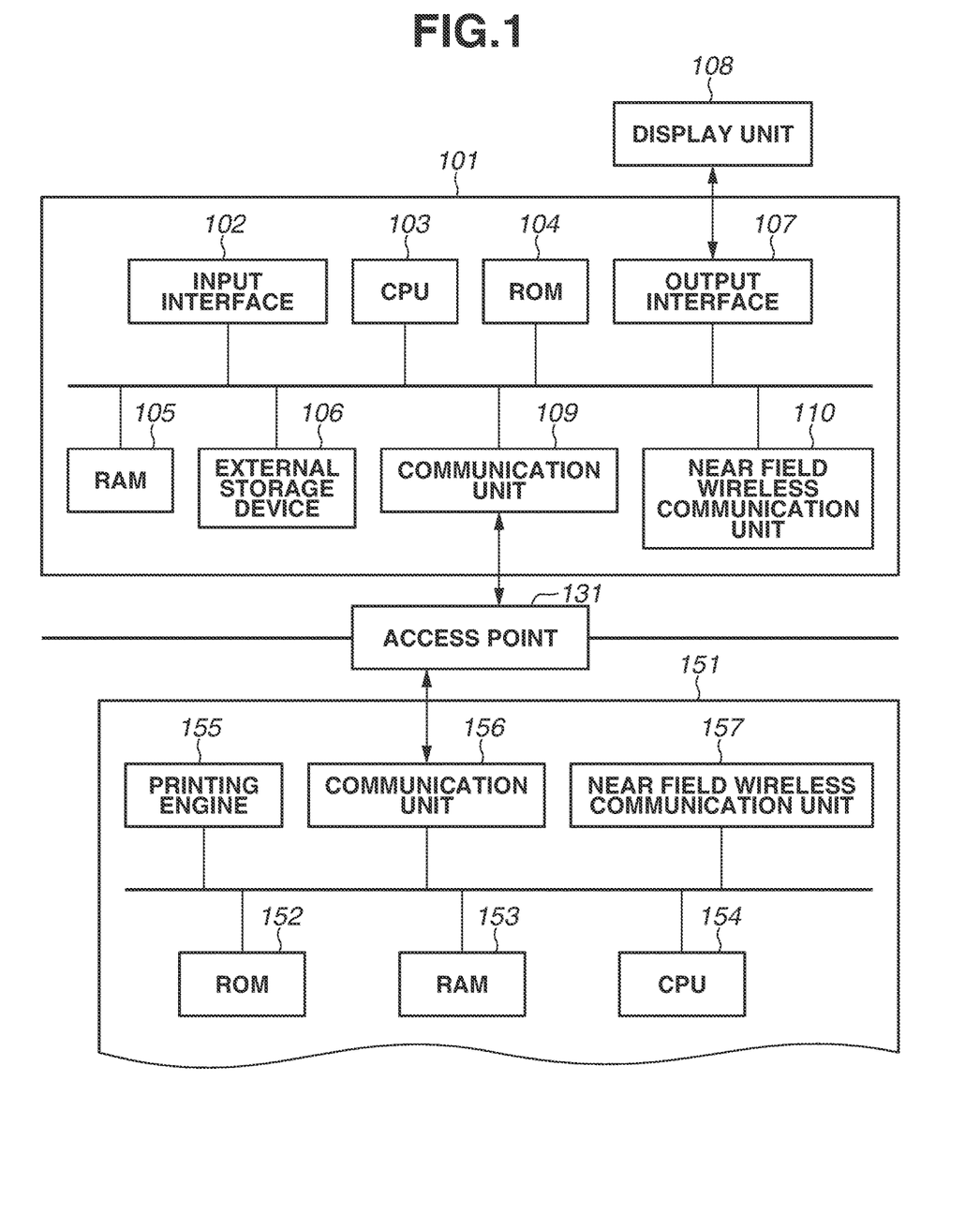
FIG. 1 is a block diagram illustrating configurations of an information processing apparatus and a communication apparatus of an exemplary embodiment of the present invention.

First, configurations of the information processing apparatus of the present exemplary embodiment and the communication apparatus communicable with the information processing apparatus of the present exemplary embodiment will be described with reference to a block diagram in FIG. 1. Further, in the present exemplary embodiment, while the following configuration will be described as an example, the present exemplary embodiment is applicable to any apparatus capable of communicating with a communication apparatus. Therefore, it is not intended to particularly limit the functions as illustrated in FIG. 1.

An information processing apparatus 101 is the information processing apparatus of the present exemplary embodiment. The information processing apparatus 101 includes an input interface 102, a central processing unit (CPU) 103, a read only memory (ROM) 104, a random access memory (RAM) 105, an external storage device 106, an output interface 107, a display unit 108, a communication unit 109, and a near field wireless communication unit 110.

The input interface 102 is configured of a physical keyboard, buttons, and a touch panel, and serves as an interface for receiving data input or an operation instruction from a user. In addition, the output interface 107 and the input interface 102 described below may be included in a same configuration, so that output of a screen and reception of a user operation may be executed by the same configuration.

The CPU 103 serves as a system control unit for controlling the entire information processing apparatus 101.

The ROM 104 stores fixed data such as a control program to be executed by the CPU 103, a data table, an embedded operating system (hereinafter, referred to as "OS") program. In the present exemplary embodiment, respective control programs stored in the ROM 104 execute software execution control such as scheduling, task switching, or interruption processing under the management of the embedded OS stored in the ROM 104.

The RAM 105 is configured of a static random access memory (SRAM) that requires a backup power source. In addition, because data is sustained by a primary battery for data backup (not illustrated), the RAM 105 can store important data such as a program control variable without volatilizing the data. Further, a memory area for storing setting information or management data of the information processing apparatus 101 is also provided on the RAM 105. Further, the RAM 105 is used as a main memory and a work memory of the CPU 103.

The external storage device 106 stores an application for providing a printing execution function and a printing information generation program for generating printing information that can be interpreted by the communication apparatus 151. Further, the external storage device 106 stores various programs such as a transmission/reception control program of the information which is transmitted or received to/from the communication apparatus 151 connected via the communication unit 109, and various types of information used for the programs.

The output interface 107 controls the display unit 108 to display data and to notify a user about a state of the information processing apparatus 101.

The display unit 108 is configured of a light-emitting diode (LED) or a liquid crystal display (LCD), and displays data or notifies a user about a state of the information processing apparatus 101. In addition, an input from the user may be received via the display unit 108 by providing a software keyboard having a numerical input key, a mode setting key, an enter key, a cancel key, and a power source key.

The communication unit 109 executes data communication by connecting to an apparatus such as the communication apparatus 151. For example, the communication unit 109 can connect to an access point (not illustrated) included in the communication apparatus 151. By making the communication unit 109 connect to the access point within the communication apparatus 151, the information processing apparatus 101 and the communication apparatus 151 can communicate with each other. In addition, the communication unit 109 may directly communicate with the communication apparatus 151 through wireless communication, or may communicate through an external access point (access point 131) existing in the outside of the information processing apparatus 101 or the communication apparatus 151. For example, Wireless Fidelity (Wi-Fi) (registered trademark) or Bluetooth (registered trademark) can be given as an example of a wireless communication method. Further, a device such as a wireless local area network (LAN) router may be given as an example of the access point 131. In the present exemplary embodiment, a method of directly connecting the information processing apparatus 101 and the communication apparatus 151 without interposing an external access point is referred to as a direct connection method. Further, a method of connecting the information processing apparatus 101 and the communication apparatus 151 via an external access point is referred to as an infrastructure connection method. Furthermore, the communication unit 109 may make a connection via a wired line.

The near field wireless communication unit 110 executes data communication by wirelessly connecting to an apparatus such as the communication apparatus 151 at a short distance through a communication method different from the communication unit 109. The near field wireless communication unit 110 can connect to a near field wireless communication unit 157 included in the communication apparatus 151. In the present exemplary embodiment, Bluetooth Low Energy (BLD) is employed as a communication method of the near field wireless communication unit 110.

The communication apparatus 151 is the communication apparatus according to the present exemplary embodiment. The communication apparatus 151 includes a ROM 152, a RAM 153, a CPU 154, a printing engine 155, a communication unit 156, and the near field wireless communication unit 157.

As an internal access point within the communication apparatus 151, the communication unit 156 includes an access point for connecting to an apparatus such as the information processing apparatus 101. This access point can connect to the communication unit 109 of the information processing apparatus 101. The communication unit 156 may directly communicate with the information processing apparatus 101 through wireless communication, or may make communication via the access point 131. Wi-Fi (registered trademark) or Bluetooth (registered trademark) may be taken as an example of the communication method. Further, the communication unit 156 may include a hardware device functioning as an access point, or may be operated as an access point through software that makes the communication unit 156 function as an access point.

The near field wireless communication unit 157 wirelessly connects to an apparatus such as the information processing apparatus 101 at a short distance. In the present exemplary embodiment, Bluetooth Low Energy (BLE) or near field communication (NFC) may be used as a communication method of the near field wireless communication unit 157.

The RAM 153 is configured of an SRAM that requires a backup power source. In addition, because data is sustained by a primary battery for data backup (not illustrated), the RAM 153 can store important data such as a program control variable without volatilizing the data. Further, a memory area for storing setting information or management data of the communication apparatus 151 is also provided on the RAM 153. Further, the RAM 153 is used as a main memory or a work memory of the CPU 154 to serve as a reception buffer for temporarily storing printing information received from the information processing apparatus 101 and to store information of various types.

The ROM 152 stores fixed data such as a control program to be executed by the CPU 154, a data table, and an OS program. In the present exemplary embodiment, respective control programs stored in the ROM 152 perform software execution control such as scheduling, task switching, or interruption processing under the management of the embedded OS stored in the ROM 152.

The CPU 154 serves as a system control unit for controlling the entire communication apparatus 151.

The printing engine 155 forms an image on a recording medium such as a sheet by using a recording agent such as ink and outputs a printing result based on information stored in the RAM 153 or a print job received from the information processing apparatus 101. At this time, because a data amount of the print job transmitted from the information processing apparatus 101 is large, it is necessary to perform communication at a high speed. Therefore, the print data is received through the communication unit 156 that can communicate at a speed higher than the near field wireless communication unit 157. In addition, the print job may be generated by an application or a printer driver operating in the information processing apparatus 101.

Further, a memory such as an external hard disk drive (HDD) or a secure digital (SD) card may be attached to the communication apparatus 151 as an optional device, and the information to be stored in the communication apparatus 151 may be stored in that memory.

Further, a connection mode is set to the communication apparatus 151 of the present exemplary embodiment through connection setting processing, so that the communication apparatus 151 communicates with the information processing apparatus 101 through the connection mode set thereto. In the present exemplary embodiment, an infrastructure connection mode is set to the communication apparatus 151 as a connection mode when communication is executed through the infrastructure connection, and a direct connection mode is set thereto as a connection mode when communication is executed through direct connection.

In the present exemplary embodiment, while role allocation between the information processing apparatus 101 and the communication apparatus 151 has been described as the above, the role allocation is not particularly limited thereto, and another allocation may be also possible. Hereinafter, the communication apparatus 151 will be described as a printing apparatus 151.

Subsequently, a multi-session according to the present exemplary embodiment will be described. The multi-session is a system of executing printing by performing predetermined processing without making the user perform reprinting operation in a case where a printing request is received through network communication when the printing apparatus 151 cannot accept a printing request. In addition, Keep-Alive communication or printing request retry processing executed by the operating system of the information processing apparatus 101 may be given as an example of the above-described predetermined processing.

The multi-session will be described with reference to FIG. 2.

First, the user inputs a printing execution instruction to the information processing apparatus 101.

The information processing apparatus 101 receives the printing execution instruction from the user, generates a print job, and transmits a start notification of the print job to the printing apparatus 151. Further, in step 201, the information processing apparatus 101 transmits a request for acquiring the state of the printing apparatus 151 to the printing apparatus 151.

Figure 2:
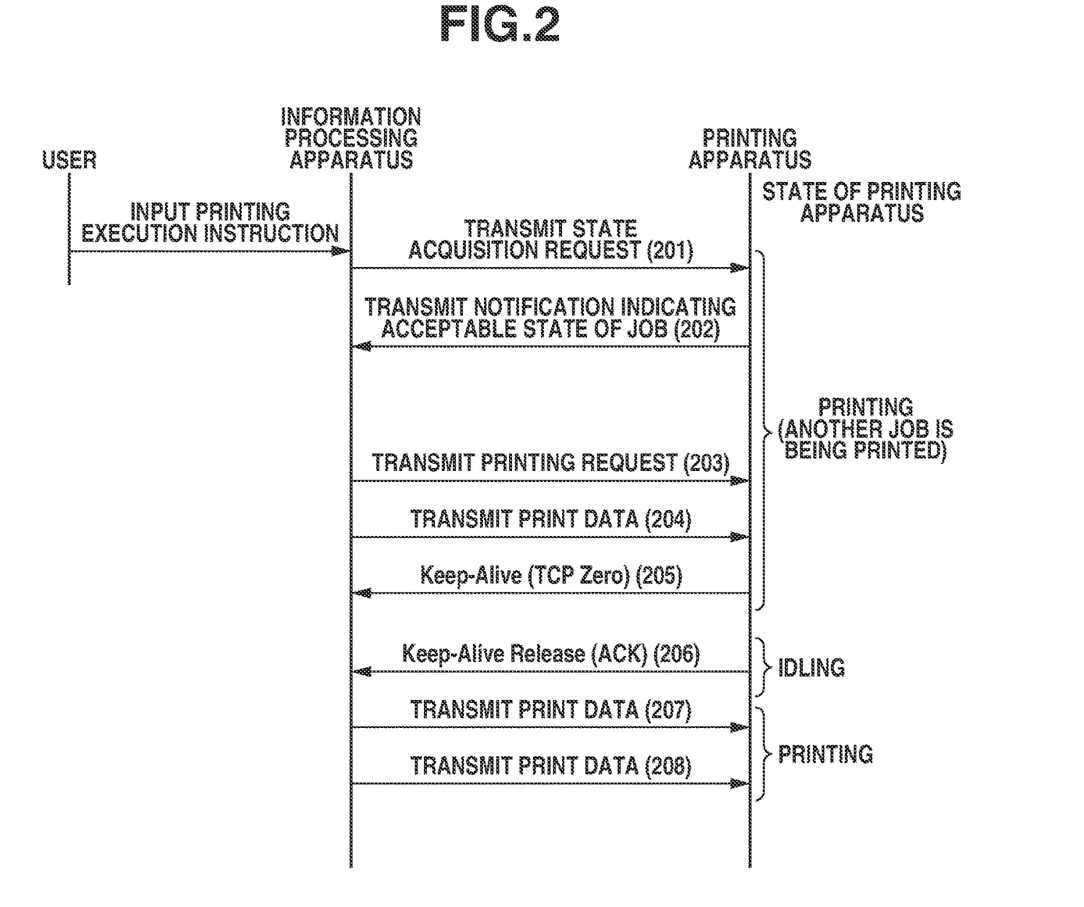
FIG. 2 is a diagram illustrating a multi-session.

In the example in FIG. 2, the printing apparatus 151 is processing another print job, so that printing cannot be executed even if the print job is transmitted from the information processing apparatus 101. However, in step 202, the printing apparatus 151 transmits a notification indicating that the print job is acceptable because the multi-session function is executable.

In steps 203 to 204, the information processing apparatus 101 receives the notification indicating that the state of the print job is acceptable and transmits a printing request and print data to the printing apparatus 151. Here, because printing processing based on the print data cannot be executed practically, the printing apparatus 151 transmits a Keep-Alive notification to the information processing apparatus 101 in step 205. The information processing apparatus 101 receives the Keep-Alive notification and makes an inquiry about whether print data can be transmitted until the information processing apparatus 101 receives a Keep-Alive Release (ACK). The printing apparatus 151 transmits the Keep-Alive notification in response to the inquiry until printing becomes executable. Then, when another print job is completed, the printing apparatus 151 is brought into an idling state where the print job is acceptable. Therefore, in step 206, the printing apparatus 151 transmits the Keep-Alive Release (ACK) to the information processing apparatus 101. Since the Keep-Alive Release (ACK) is received, the information processing apparatus 101 transmits the waiting print data to the printing apparatus 151 in steps 207 and 208.

As described above, even if the printing apparatus 151 is processing another print job and cannot accept the print job, print data can be automatically transmitted by using the multi-session. Therefore, the user does not have to input the printing execution instruction again, so that operability can be improved.

On the other hand, in the printing apparatus 151, a number of communications concurrently sustainable by the multi-session in a protocol unit has an upper limit. For the sake of simplicity, in the present exemplary embodiment, the number of communications concurrently sustainable by the multi-session in a protocol unit is set to "5". If the user inputs a printing execution instruction in a state where the printing apparatus 151 is concurrently sustaining five connections through the multi-session, the information processing apparatus 101 fails to connect to the printing apparatus 151. Since the connection has failed, the information processing apparatus 101 cannot transmit the above-described state acquiring request to the printing apparatus 151 in step 201. As a result, the information processing apparatus 101 cannot recognize the state of the printing apparatus 151. If the information processing apparatus 101 cannot recognize the state of the printing apparatus 151, there is a risk that connection processing continues to be uselessly executed although the printing apparatus 151 cannot execute communication because, for example, a power source thereof is turned OFF. On the other hand, if the number of communications concurrently sustainable by the printing apparatus 151 through the multi-session has reached the upper limit, there is a possibility that the information processing apparatus 101 can connect thereto by repeatedly executing connection processing. However, there is a risk that the information processing apparatus 101 ends retry of connection processing that should be executed continuously if the state of the printing apparatus 151 cannot be recognized thereby. In other words, there is a risk that convenience is decreased because the information processing apparatus 101 cannot acquire the state of the printing apparatus 151. Therefore, in the present exemplary embodiment, in order to enable the information processing apparatus 101 to recognize the state of the printing apparatus 151, the printing apparatus 151 manages the number of communications through the multi-session by a method illustrated in FIG. 3.

Figure 3:
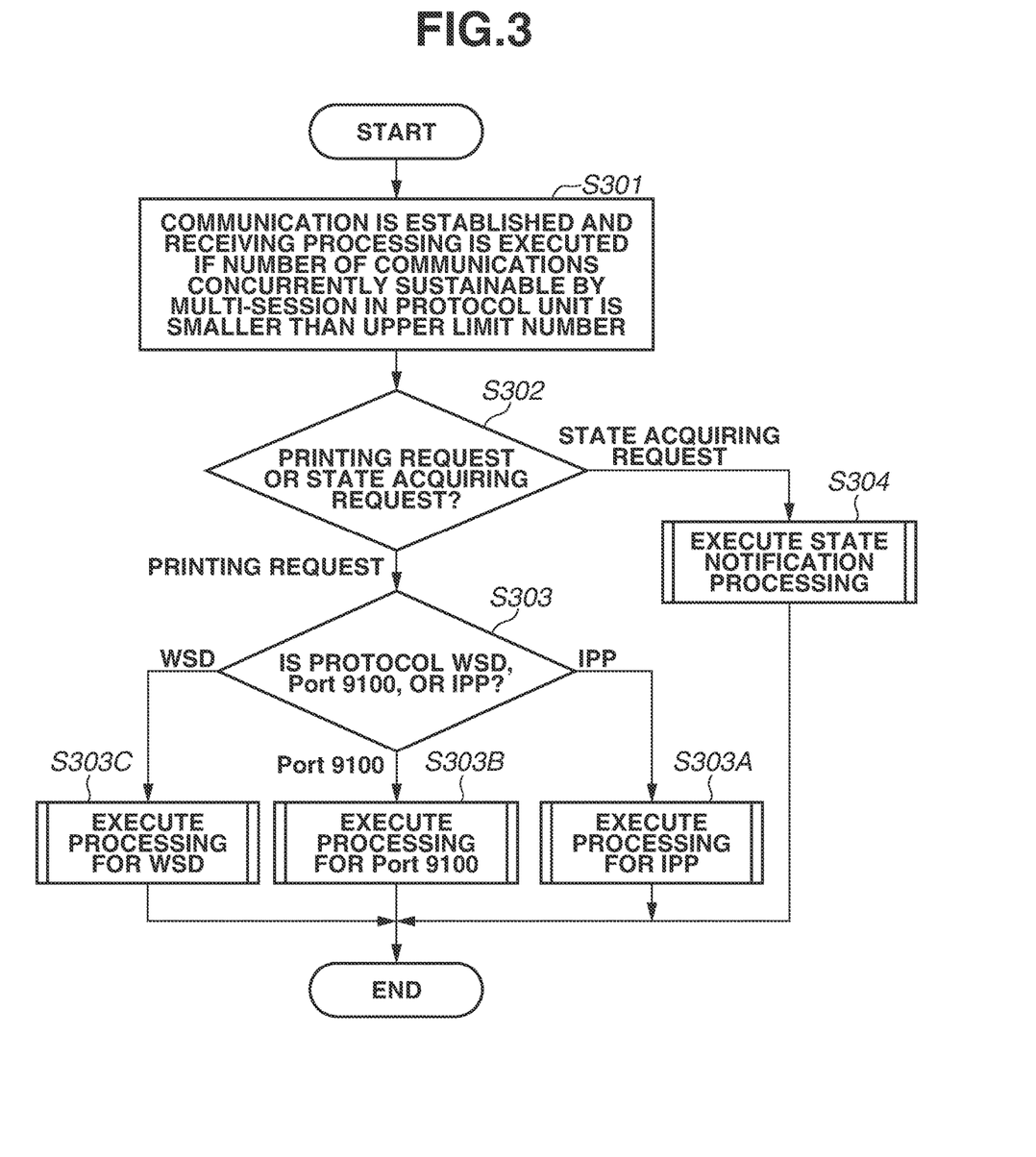
FIG. 3 is a flowchart illustrating a flow of processing executed by a printing apparatus.

FIG. 3 is a flowchart to be executed by the printing apparatus 151. In the present exemplary embodiment, the CPU 154 reads and executes a program relating to the flowchart to realize each step in the flowchart illustrating the processing to be executed by the printing apparatus 151.

In step S301, the CPU 154 receives a request from the information processing apparatus 101. In step S302, the CPU 154 analyzes the content of the request to determine whether the request is a printing request or a state acquiring request. Communication is established and the receiving processing in step S301 is executed if the number of communications concurrently sustainable by the multi-session in a protocol unit is smaller than the upper limit number (i.e., if the number of communications is smaller than 5). In step S302, if the CPU 154 determines that the state acquiring request is received (STATE ACQUIRING REQUEST in step S302), the processing proceeds to step S304. In step S304, the CPU 154 performs state notification processing. Details of the processing in step S304 will be described below with reference to FIG. 7. In step S302, if the CPU 154 determines that the printing request is received (PRINTING REQUEST in step S302), the processing proceeds to step S303. In step S303, the CPU 154 determines a path (protocol). The state acquiring request corresponds to the processing in step 201 in FIG. 2, and the printing request corresponds to the processing in step 203 in FIG. 2. Specifically, in the processing in step S303, the CPU 154 makes a determination by using a communication port used for the printing request. If a plurality of protocols is allocated to the same port, the CPU 154 may make a determination by using a uniform resource identifier (URI) address as a transmission destination of the printing request.

If the determination result in step S303 is the IPP (in the present exemplary embodiment, a communication port 631) ("IPP" in step S303), the processing proceeds to step S303A. On the other hand, if the determination result in step S303 is the Port 9100 ("Port 9100" in step S303), the processing proceeds to step S303B. If the determination result in step S303 is web services on devices (WSD) ("WSD" in step S303), the processing proceeds to step S303C.

Subsequently, the processing in step S303A will be described with reference to FIG. 4.

If the protocol is determined as the IPP in step S303, in step S305, the CPU 154 counts the number of communications currently sustained through the IPP and establishes a connection corresponding to the printing request received in step S301 to determine whether the number of communications exceeds the upper limit number of printing requests. The upper limit number of printing requests used for the determination in step S305 corresponds to a number of communications in which a remaining number of communications concurrently connectable through the IPP becomes 1. In other words, as described above, in the present exemplary embodiment, since the upper limit number of communications concurrently connectable through one protocol is "5", the upper limit number of printing requests to be used for the determination in step S305 is "4". Therefore, according to the present exemplary embodiment, in step S305, the CPU 154 determines whether the upper limit number of printing exceeds "4" by establishing the connection corresponding to the printing request received in step S301. In other words, the CPU 154 determines whether the number concurrently connectable through the IPP becomes "zero" by establishing the connection corresponding to the printing request received in step S301.

In step S305, if the CPU 154 determines that the number of communications does not exceed the upper limit number of printing requests (NO in step S305), the processing in step S306 is executed. If the CPU 154 determines that the number of communications exceeds the upper limit number (YES in step S305), the processing in step S310 is executed.

In step S310, the CPU 154 executes ending processing of the print data. Herein, the processing in step S310 will be described using one example. Even in a case where it is notified in step S322 of FIG. 7 that "the print job is unacceptable", there is a possibility that a printing request is transmitted for some reason, for example, that acquisition of the state is delayed in the information processing apparatus 101. Therefore, if "the print job is unacceptable", the CPU 154 prevents print data from being transmitted by notifying an NG in response to the printing request. If the information processing apparatus 101 still disregards the status and transmits print data by establishing a session, the printing apparatus 151 ends the transmit session of the print data as soon as possible. In the present exemplary embodiment, if the print data is transmitted from the information processing apparatus 101 when the number of communications using the IPP is "4", the number of communications using the IPP will be "5". As a result, the number of communications reaches the upper limit, so that there is a risk that another apparatus cannot transmit a state acquisition request until transmission of the print data is ended. Therefore, the printing apparatus 151 has to promptly end the communication for the print data that has been transmitted in disregard of the status. Therefore, with respect to the print data transmitted from the information processing apparatus 101 when the number of communications using the IPP is "4", the CPU 154 executes read-discarding processing and promptly discards the received data without making an analysis to speed up the receiving processing. Therefore, the CPU 154 can return the number of communications using the IPP to "4" by promptly disconnecting and ending the communication. The processing in step S310 is also referred to as disconnection processing.

The CPU 154 releases the IPP connection when printing processing of print data is completed. Then, at the time when a remaining number of communications concurrently connectable through the IPP has become 2 or more by releasing the IPP connection (in the present exemplary embodiment, at the time when the number of communications has become "3"), the CPU 154 transmits a notification indicating that "the print job is acceptable" in response to the state acquisition request.

In step S305, if the CPU 154 determines that the number of communications does not exceed the upper limit number (NO in step S305), the processing proceeds to step S306. In step S306, the CPU 154 determines whether the printing request is acceptable. More specifically, in step S306, the CPU 154 checks whether another print job is being processed, and determines that the printing request is not acceptable if another print job is being processed. In step S306, the CPU 154 also determines that the printing request is not acceptable if an error has occurred in the printing apparatus 151.

In step S306, if the CPU 154 determines that the printing request is not acceptable (NO in step S306), the processing proceeds to step S307. In step S307, the CPU 154 sustains the IPP connection through Keep-Alive communication. The CPU 154 does not receive print data from the information processing apparatus 101 while the IPP connection is being sustained through the Keep-Alive communication.

On the other hand, if the CPU 154 determines that the printing request is acceptable (YES in step S306), the processing proceeds to step S308. In step S308, the CPU 154 receives print data from the information processing apparatus 101. Then, in step S309, the CPU 154 executes printing processing based on the print data. When the unacceptable state is changed to the acceptable state in step S306, the CPU 154 notifies the information processing apparatus 101 of the Keep-Alive Release (ACK). When the information processing apparatus 101 receives the Keep-Alive Release (ACK), it transmits the print data.

Figure 5:
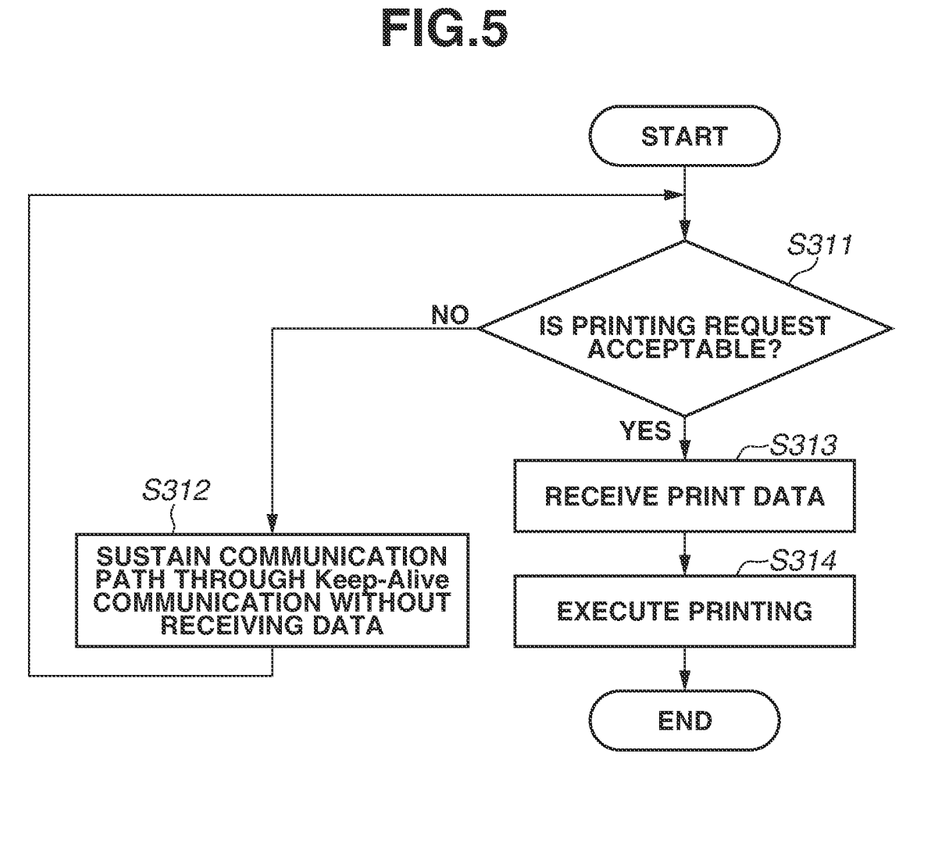
FIG. 5 is a flowchart illustrating a flow of processing for a Port 9100 executed by the printing apparatus.

Next, the processing in step S303B will be described with reference to FIG. 5. If the determination result in step S303 is the Port 9100, the CPU 154 executes the processing in steps S311 to S314. The processing in steps S311 to S314 is similar to the processing in steps S306 to S309, so that detailed description thereof will be omitted.

Figure 6:
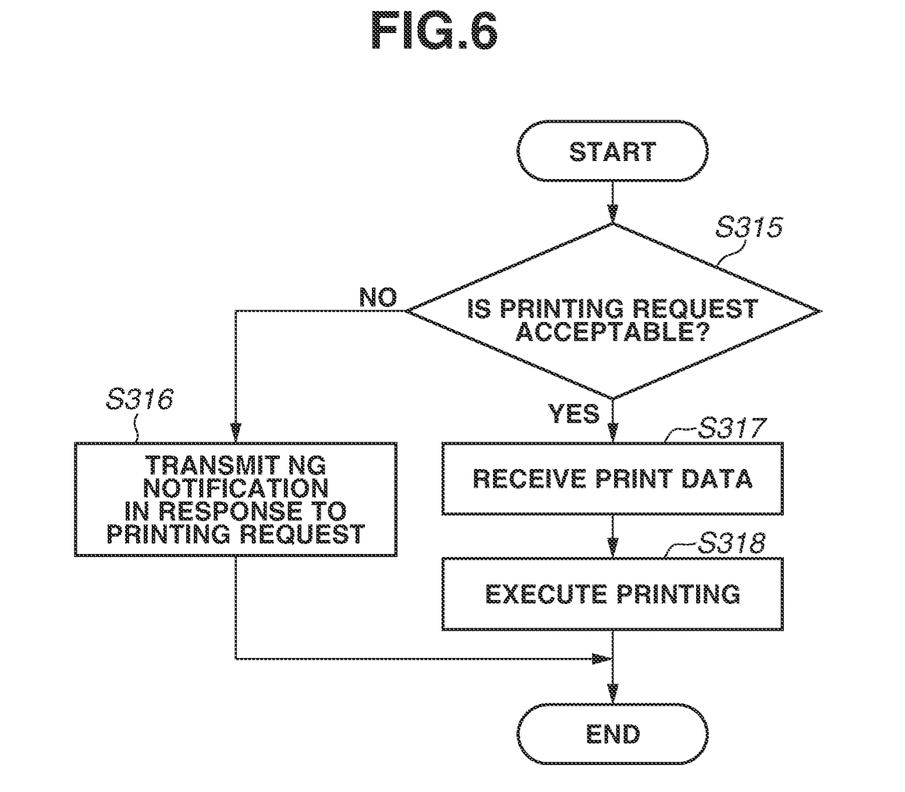
FIG. 6 is a flowchart illustrating a flow of processing for web services on devices (WSD) executed by the printing apparatus.

Next, the processing in step S303C will be described with reference to FIG. 6. If the determination result in step S303 is the WSD, the CPU 154 executes the processing in steps S315 to S318. The processing in steps S315, S317, and S318 is similar to the processing in steps S306, S308, and S309, so that detailed description thereof will be omitted. If the CPU 154 determines that the printing request is not acceptable (NO in step S315), the processing proceeds to step S316. In step S316, the CPU 154 transmits a notification indicating that the printing request is unacceptable, to the information processing apparatus 101. In a case where the WSD protocol is used, the information processing apparatus 101 that receives the notification indicating that the printing request is unacceptable, executes retry of the printing request under control of the operating system (OS). Then, the printing apparatus 151 transmits a notification indicating that the printing request is unacceptable, instead of executing the Keep-Alive communication because the multi-session is realized through retry of the printing request controlled by the OS.

Figure 7:
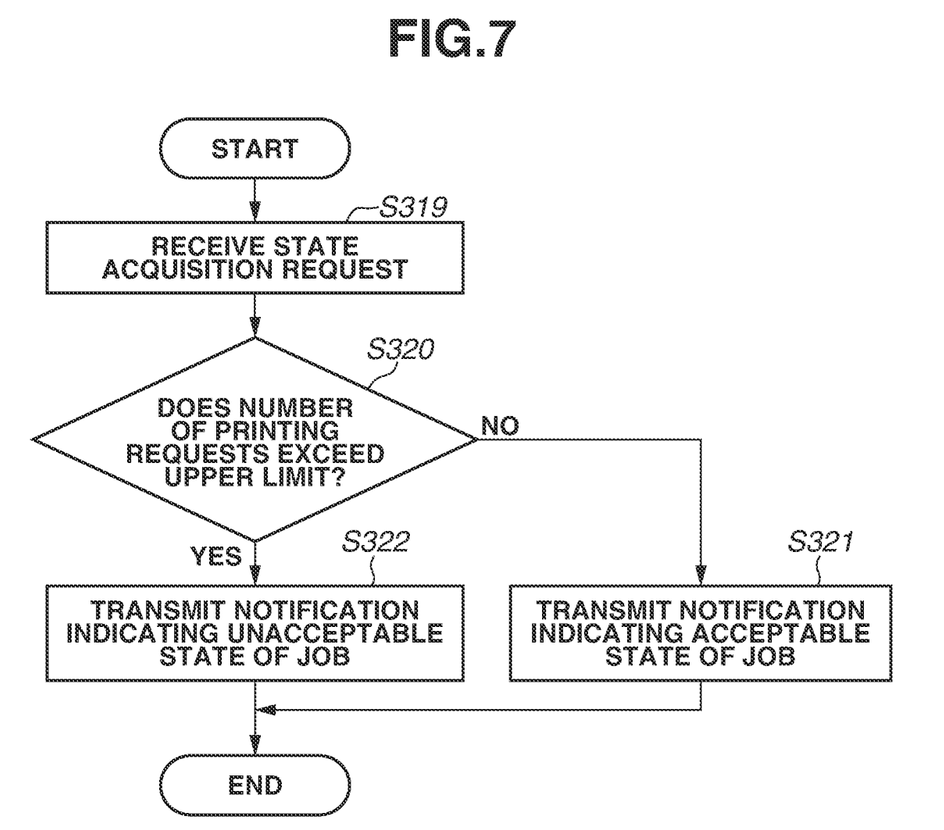
FIG. 7 is a flowchart illustrating a flow of state notification processing executed by the printing apparatus.

The processing in step S304 will be described with reference to FIG. 7. As described above, the CPU 154 manages the printing request to make the upper limit number of printing requests through the IPP (i.e., "4", in the present exemplary embodiment) smaller than the upper limit number of communications in the multi-session (i.e., "5", in the present exemplary embodiment). Therefore, the number of communications through the IPP has space. Therefore, the CPU 154 uses one free connection to accept a state acquisition request, and notifies the information processing apparatus 101 of a state of the printing apparatus 151.

This processing will be described below in detail. In step S319, the CPU 154 receives the state acquisition request. In step S320, the CPU 154 counts the number of currently-communicating printing requests, and determines whether the counting result is the upper limit of printing requests or more. According to the present exemplary embodiment, the CPU 154 determines that the number of currently-communicating printing requests is the upper limit or more if the number thereof is "4", and determines that the number of currently-communicating printing requests is smaller than the upper limit if the number thereof is smaller than "4". If the number of printing requests is the upper limit or more (YES in step S320), the processing proceeds to step S322. In step S322, the CPU 154 transmits a notification indicating that the printing request is unacceptable, to the apparatus which is a transmission source of the state acquiring request. On the other hand, if the CPU 154 determines that the number of printing requests is smaller than the upper limit number (NO in step S320), the processing proceeds to step S321. In step S321, the CPU 154 transmits a notification indicating that the printing request is acceptable, to the apparatus which is a transmission source of the state acquiring request. In other words, if the number of printing requests is "4" when the determination in FIG. 7 is executed, it is not possible to accept the printing request (corresponding to the processing in step 204 in FIG. 2) transmitted subsequent to reception of the state acquiring request (corresponding to the processing in step 202 in FIG. 2). Therefore, in response to the state acquiring request, a notification indicating that the state of the job is unacceptable, is transmitted through the processing in steps S320 and S322, so that the information processing apparatus 101 does not have to issue the printing request uselessly. When the printing apparatus 151 transmits a response in step S321 or S321 with respect to the state acquiring request, communication of the state acquiring request is completed, so that the number of communications is reduced by one. In other words, if the printing apparatus 151 receives the state acquiring request in a state where the number of communications is "4", a response to the state acquiring request is transmitted in a state where the number of communications has become "5". Because communication is completed when notification processing of the response is completed, the number of communications executed by the printing apparatus 151 is reduced by one and returns to 4.

Figure 8:
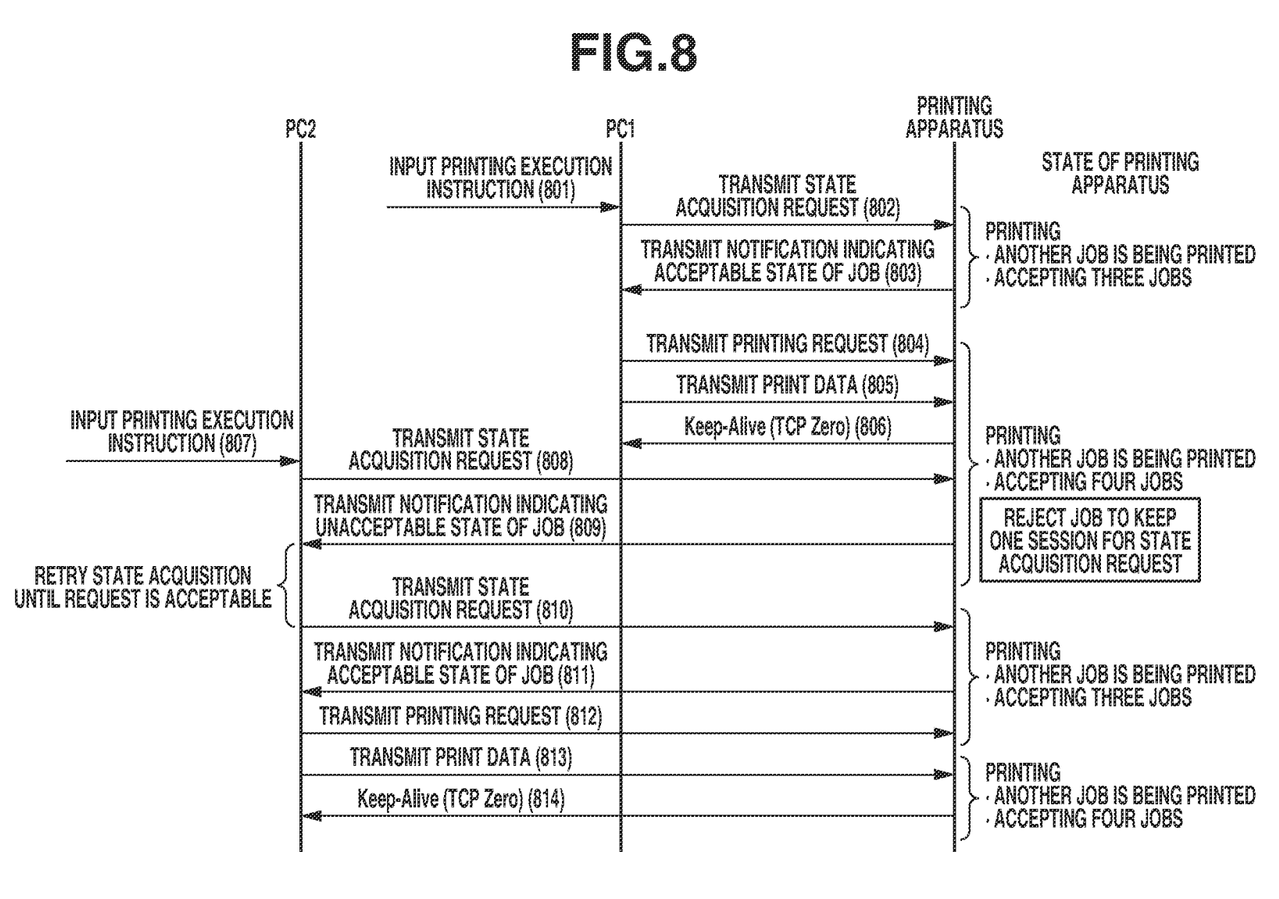
FIG. 8 is a diagram illustrating a multi-session.

Herein, processing to be executed when the protocol is determined as the IPP (steps S303 to S308) will be further described with reference to FIG. 8. In the printing apparatus 151 of the present exemplary embodiment, the upper limit number of communications concurrently connectable through the IPP is set to "5". In other words, when the number of communications connected through the IPP is "4", this is a state where a remaining number of communications concurrently connectable through the IPP is "1".

The information processing apparatus 101 (i.e., PC1) receives a printing execution instruction from a user in step 801, and transmits a state acquiring request to the printing apparatus 151 in step 802. At this stage, the printing apparatus 151 has already accepted three printing jobs. In other words, because the number of communications using the IPP is "3", in step 803, the printing apparatus 151 transmits a notification indicating an acceptable state of a job to the information processing apparatus 101 (this processing corresponds to the processing in steps S305 and S306 in FIG. 4).

The information processing apparatus 101 receives the notification indicating the acceptable state of the job, and transmits a printing request and print data to the printing apparatus 151 in steps 804 and 805. The printing apparatus 151 determines that the printing request is not acceptable because another print job is being processed. Therefore, in step 806, the printing apparatus 151 transmits a Keep-Alive notification to the information processing apparatus 101 (this processing corresponds to the processing in steps S306 and S307 in FIG. 4).

At this time, another information processing apparatus (PC2) receives a printing execution instruction from a user in step 807, and transmits a state acquiring request to the printing apparatus 151 in step 808. At this stage, the printing apparatus 151 has already accepted four printing jobs. In other words, the number of communications using the IPP is 4. Thus, a remaining number of communications concurrently connectable through the IPP is 1. Therefore, in step 809, the printing apparatus 151 transmits a notification indicating an unacceptable state of the job to the PC2 (this processing corresponds to the processing in step S322 in FIG. 7).

The PC2 receives the notification indicating the unacceptable state of the job and retries the state acquiring request until the job is acceptable. In other words, the PC2 can acquire the state of the printing apparatus 151 by using one free communication and recognize that the printing apparatus 151 is connectable to the network. Further, if the notification indicating the unacceptable state of the job is received, the PC2 can recognize that print data can be transmitted when processing of another print job is completed (or an error is corrected). Therefore, the PC2 retries the state acquiring request until the job is acceptable.

Then, the PC2 transmits the state acquiring request to the printing apparatus 151 at certain timing again. Since the processing of one of the other print jobs is completed at this timing, a remaining number of communications concurrently connectable through the IPP has become 2. Therefore, in step 811, the printing apparatus 151 transmits a notification indicating the acceptable state of the job to the PC2 (this processing corresponds to the processing in step S321 in FIG. 7).

Then, in steps 812 and 813, the PC2 transmits a printing request and print data to the printing apparatus 151. At this time, the printing apparatus 151 determines that the printing request is not acceptable because another print job is being processed. Therefore, in step 814, the printing apparatus 151 transmits a Keep-Alive notification to the PC2 (this processing corresponds to the processing in steps S306 and S307 in FIG. 4).

As described above, when the print job is to be received by using the IPP, the printing apparatus 151 manages the number of printing requests to prevent the number of communications using the IPP from reaching the upper limit number. In other words, before the number of communications reaches the upper limit number of concurrently-connectable communications (i.e., when the number of communications is 4), a notification indicating an unacceptable state of the print job is transmitted in response to the state acquiring request. With this processing, the printing apparatus 151 can manage the number of printing requests to prevent the number of communications using the IPP from reaching the upper limit number.

Therefore, the printing apparatus 151 can respond to the state acquiring request while realizing the multi-session.

Further, with respect to the protocol such as the Port 9100 or the WSD through which a state acquiring request is not transmitted through the same connection as a connection for transmitting the printing request, the multi-session is permitted until the number of communications reaches the upper limit number of concurrently-connectable communications. In other words, according to the first exemplary embodiment, the printing request is accepted until the number of communications becomes "5". This is because the state acquiring request is not executed through the same connection as the connection for executing the printing request if the communication protocol is the Port 9100 or the WSD. In other words, in contrast to the case of the IPP, if the communication protocol is the Port 9100 or the WSD, the printing request is acceptable until the number of communications becomes 5 because a free connection for the state acquiring request does not have to be created.

A second exemplary embodiment will be described below. In a case where the IPP is used, the printing apparatus 151 can receive a print job through an IPP-over-USB path through which HTTP communication is performed in a pseudo manner through a universal serial bus (USB) path in addition to receiving the print job through the network (NW) path. In a method described in the present exemplary embodiment, the upper limit number of concurrent communications is independently managed with respect to the communication sessions established through the USB connection and the NW connection. With respect to the point where description thereof is omitted, processing is executed according to the first exemplary embodiment.

In the present exemplary embodiment, one USB-device port is connected to one of the other apparatuses through the USB path. The printing apparatus 151 provides two connections concurrently communicable through the USB connection. One of the connections is used for transmitting print data, and another one is used for a state acquiring request.

Further, in the present exemplary embodiment, an upper limit number of printing requests in the USB connection is set to 1.

Figure 9:
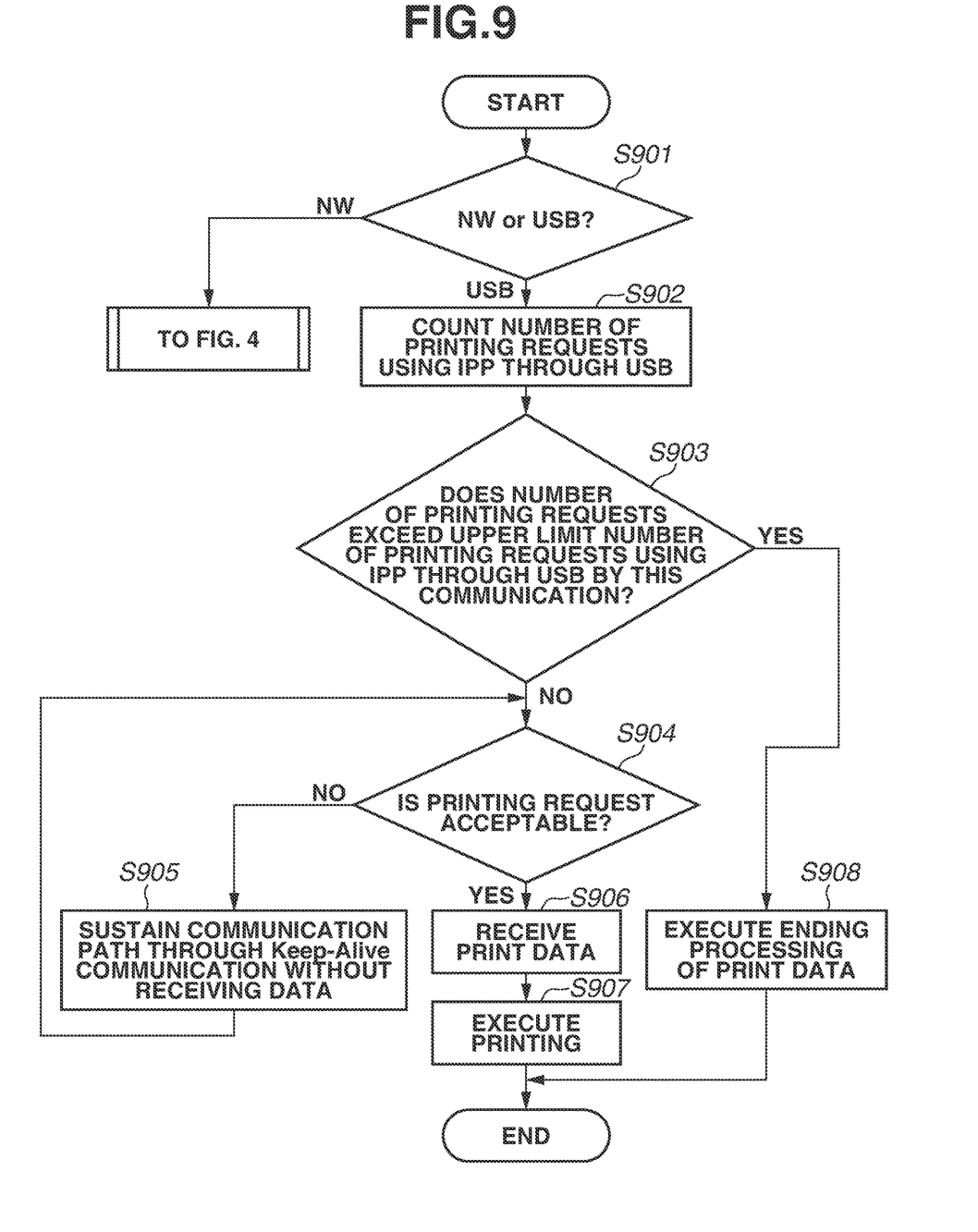
FIG. 9 is a flowchart illustrating a flow of processing for the IPP executed by the printing apparatus.

The processing will be described below with reference to FIG. 9. The processing in FIG. 9 is executed if the communication protocol is determined as the IPP in step S303 of FIG. 3.

In step S901, the CPU 154 determines whether the communication path of the printing request is the network or the USB. In step S901, if the communication path is determined as the network (NW in step S901), the processing illustrated in FIG. 4 is executed.

On the other hand, if the communication path is determined as the USB (USB in step S901), the processing proceeds to step S902. In step S902, the CPU 154 counts the current number of communications using the IPP through the USB connection. In step S903, the CPU 154 determines whether the number of communications exceeds the upper limit number of printing requests by establishing a connection corresponding to the printing request received in step S301. The upper limit number of printing requests used for the determination in step S903 corresponds to a number of communications by which a remaining number of communications concurrently connectable by using the IPP through the USB connection becomes 1. In other words, as described above, in the present exemplary embodiment, because the upper limit number of communications connectable by using the IPP through the USB connection is "2", the upper limit number of printing requests used for the determination in step S903 is "1". Therefore, according to the present exemplary embodiment, in step S903, the CPU 154 determines whether the number of communications exceeds "1" as the upper limit number of printing requests by establishing the connection corresponding to the printing request received in step S301.

In step S903, if the CPU 154 determines that the number of communications does not exceed the upper limit number of printing requests (NO in step S903), the processing in steps S904 to S907 is executed. On the other hand, in step S903, if the CPU 154 determines that the number of communications exceeds the upper limit number of printing requests (YES in step S903), the processing in step S908 is executed. Further, the processing in steps S904 to S908 is similar to the processing in steps S306 to S310, so that detailed description thereof will be omitted.

In addition, if the Port 9100 or the WSD is used as the communication protocol, processing similar to the first exemplary embodiment is executed while description thereof will be omitted in the present exemplary embodiment.

According to the present exemplary embodiment, in a case where the IPP is used, the upper limit number of the printing requests is managed by different values depending on whether the connection path is the network or the USB. Therefore, the multi-sessions suitable for respective connections can be established.

According to the present exemplary embodiment, a different value is set as the upper limit number of communications depending on whether communication using the IPP is performed through the network or the USB. Therefore, it is possible to manage the upper limit number suitable for each of the communication modes.

Other Exemplary Embodiments

In the above-described first or the second exemplary embodiment, the printing apparatus 151 manages the number of communications in such a manner that one communication is to be kept free to receive the state acquiring request. However, at least one connection may be kept to be free. Therefore, the printing apparatus 151 could manage the number of communications to keep more than one communications free to receive the state acquiring request.

Further, in the first or the second exemplary embodiment, while one communication is kept free to receive the state acquiring request, the communication may be kept free for use in another purpose.

Further, while the processing in the first or the second exemplary embodiment is executed by the printing apparatus 151, similar processing may be executed by another apparatus such as a digital camera, a mobile terminal, or a tablet device.

Further, in step S322 or S321, a notification simply indicating "unacceptable" or "acceptable" may be transmitted.

Figure 4:
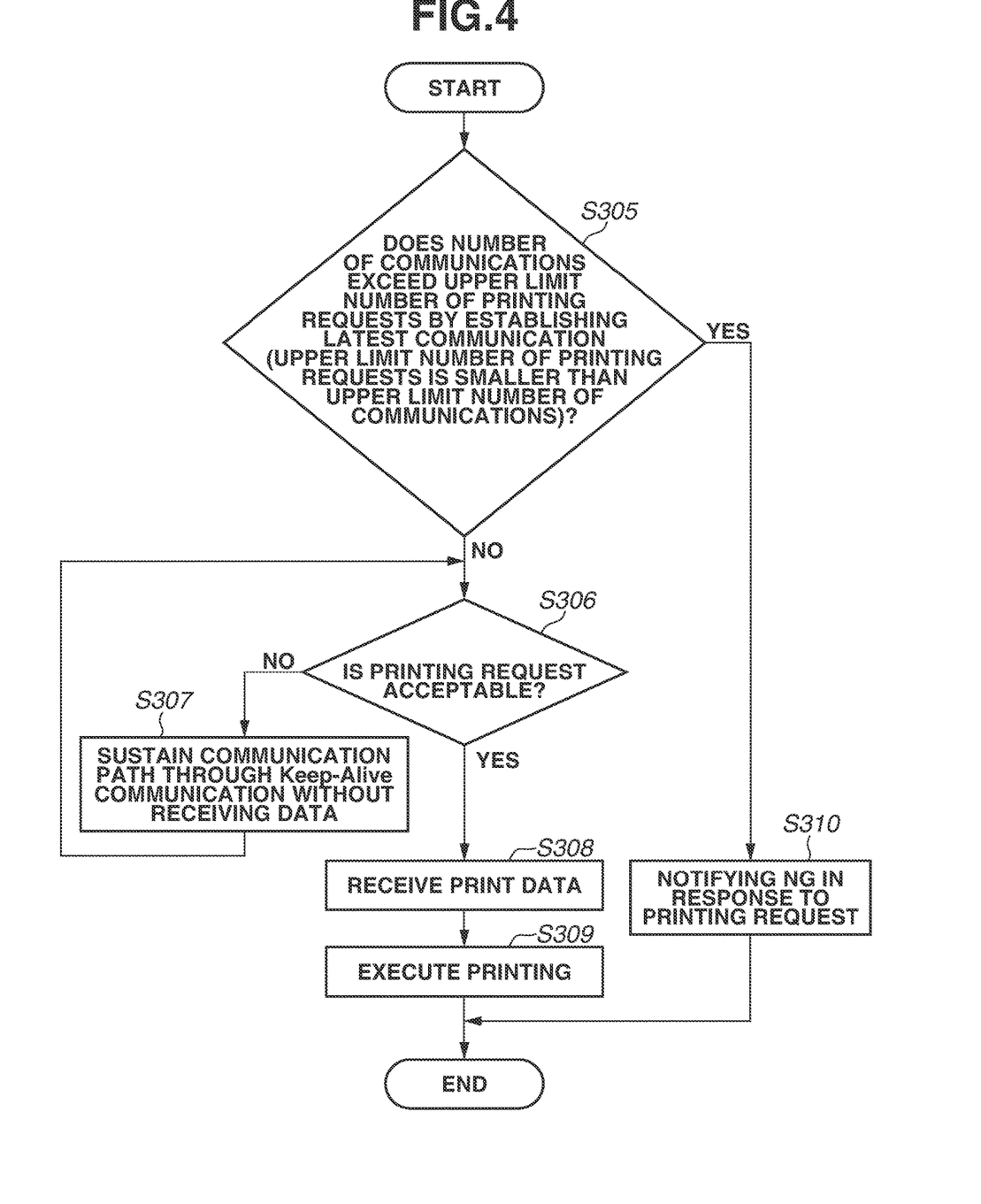
FIG. 4 is a flowchart illustrating a flow of processing for an internet printing protocol (IPP) executed by the printing apparatus.

Further, in the first or the second exemplary embodiment, processing in FIG. 4 or 9 is executed in a case where the IPP is used. However, another protocol may be used to execute the processing in FIG. 4 as long as a printing request is transmitted through that protocol after a state acquiring request is notified.

In addition, the above-described exemplary embodiments can be realized by executing the following processing. In other words, software (program) for realizing the function of the above-described exemplary embodiment is supplied to a system or an apparatus via a network or various storage media. Then, a computer (a CPU, a micro processing unit (MPU), or a processor) of the system or the apparatus reads and executes the program. Further, the program may be executed by a single computer, or may be cooperatively executed by a plurality of computers. Furthermore, not all of the above-described processing has to be realized by software, and all or a part of the processing may be realized by hardware such as an application specific integrated circuit (ASIC). Further, not all of the processing has to be executed by a single CPU. A plurality of CPUs may appropriately cooperate with each other to execute the processing.

Through the present invention, the information processing apparatus can acquire the state of the printing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-081620, filed Apr. 17, 2017, which is hereby incorporated by reference herein in its entirety.

What is claimed is:

1. A printing apparatus comprising:
at least one processor execution instructions to act as:
an establishment unit configured to establish communication with an information processing apparatus according to a first protocol in a case where a number of communications using the first protocol is smaller than a first upper limit of number of communication concurrently sustainable through the first protocol;
a determination unit configured to execute determination processing for determining whether the number of communications using the first protocol exceeds a second upper limit of number of communication as a result of establishing the communications by the establishment unit, wherein the second upper limit is smaller than the first upper limit; and
a control unit configured to notify the information processing apparatus of information showing that a print job is not acceptable through the established communication in a case where it is determined that the number of communications exceeds the second upper limit,
wherein, in a case where a request is received through a second protocol different from the first protocol, communication processing using the second protocol is executed without executing the determination processing.

2. The printing apparatus according to claim 1, wherein, in a case where the number of communications exceeds the second upper limit as a result of establishing communication by the establishment unit and print data is received from the information processing apparatus through the established communication, the control unit executes disconnection processing for disconnecting the communication with the information processing apparatus.

3. The printing apparatus according to claim 2, wherein the disconnection processing is processing for discarding the received print data without making an analysis.

4. The printing apparatus according to claim 1, wherein, in the communication according to the first protocol, a state information acquiring request is executed prior to a printing request.

5. The printing apparatus according to claim 1, wherein, in a case where a state information acquiring request is received from the information processing apparatus through the established communication and the number of communications does not exceed the second upper limit when the establishment unit establishes the communication, the control unit transmits a notification indicating a state where a print job is acceptable as the state information.

6. The printing apparatus according to claim 1, wherein the second upper limit is not used in communication according to the second protocol different from the first protocol.

7. The printing apparatus according to claim 1,
wherein a third upper limit of number of communications smaller than the second upper limit is set for a universal serial bus (USB) connection using the first protocol,
wherein the third upper limit is used in a case where the printing apparatus communicates with the information processing apparatus through the USB connection using the first protocol, and
wherein the second upper limit is used in a case where the printing apparatus communicates with the information processing apparatus through a network connection using the first protocol.

8. The printing apparatus according to claim 1, wherein the first protocol is an internet printing protocol.

9. The printing apparatus according to claim 1, wherein the second protocol is a web services on devices (WSD) protocol.

10. A control method of a printing apparatus comprising at least one processor, the at least one processor executing instructions to:
establish communication with an information processing apparatus according to a first protocol in a case where a number of communications using a first protocol is smaller than a first upper limit of number of communication concurrently sustainable through the first protocol;
execute determination processing for determining whether the number of communications using the first protocol exceeds a second upper limit as a result of establishing the communication by the establishing, wherein the second upper limit is smaller than the first upper limit; and
notify the information processing apparatus of information showing that a print job is not acceptable through the established communication in a case where it is determined that the number of communications exceeds the second upper limit number,
wherein, in a case where a request is received through a second protocol different from the first protocol, communication processing using the second protocol is executed without executing the determination processing.

11. The control method according to claim 10, wherein, in a case where the number of communications exceeds the second upper limit as a result of establishing the communication and print data is received from the information processing apparatus through the established communication, disconnection processing for disconnecting communication with the information processing apparatus is executed.

12. The control method according to claim 11, wherein the disconnection processing is processing for discarding the received print data without making an analysis.

13. The control method according to claim 10, wherein a state information acquiring request is executed prior to a printing request in the communication according to the first protocol.

14. The control method according to claim 10, wherein, in a case where a state information acquiring request is received from the information processing apparatus through the established communication and a number of communications does not exceed the second upper limit number when the communication is established, a notification indicating a state where a print job is acceptable is transmitted as the state information.

15. The control method according to claim 10, wherein the second upper limit number is not used in communication according to the second protocol different from the first protocol.

16. The control method according to claim 10,
wherein a third upper limit of number of communication smaller than the second upper limit is set for a universal serial bus (USB) connection using the first protocol,
wherein the third upper limit is used in a case where the printing apparatus communicates with the information processing apparatus through the USB connection using the first protocol, and
wherein the second upper limit is used in a case where the printing apparatus communicates with the information processing apparatus through a network connection using the first protocol.

17. The control method according to claim 10, wherein the first protocol is an internet printing protocol.

18. The control method according to claim 10, wherein the second protocol is a WSD protocol.

19. A non-transitory computer-readable storage medium storing a program relating to a control method executed by a printing apparatus, the control method comprising at least one processor executing instructions to:
establish communication with an information processing apparatus according to a first protocol in a case where a number of communications using the first protocol is smaller than a first upper limit of number of communication concurrently sustainable through the first protocol;
execute determination processing for determining whether the number of communications using the first protocol exceeds the second upper limit number as a result of establishing the communication by the establishing; and
notify the information processing apparatus of information showing that a print job is not acceptable through the established communication in a case where it is determined that the number of communications exceeds a second upper limit number of communication smaller than the first upper limit,
wherein, in a case where a request is received through a second protocol different from the first protocol, communication processing using the second protocol is executed without executing the determination processing.

20. The non-transitory computer-readable storage medium according to claim 19, wherein, in a case where the number of communications exceeds the second upper limit as a result of establishing the communication and print data is received from the information processing apparatus through the established communication, disconnection processing for disconnecting communication with the information processing apparatus is executed.

* * * * *